(No Model.)

E. P. DAVIS.
CULTIVATOR.

No. 275,159. Patented Apr. 3, 1883.

Witnesses:
Edward Brodhag
R. E. Grant

Inventor:
Eber P. Davis
by Johnson and Johnson
Attys

UNITED STATES PATENT OFFICE.

EBER P. DAVIS, OF WITCHERVILLE, ARKANSAS.

CULTIVATOR.

SPECIFICATION forming part of Letters Patent No. 275,159, dated April 3, 1883.

Application filed December 9, 1882. (No model.)

*To all whom it may concern:*

Be it known that I, EBER P. DAVIS, a citizen of the United States, residing at Witcherville, in the county of Sebastian and State of Arkansas, have invented new and useful Improvements in Cultivators, of which the following is a specification.

My invention is directed to the improvement of cultivator-plows adapted for use with a detachable shovel-carrying side bar.

My improvement embraces a construction and combination in which the side shovel-bar is braced directly from the main plow-standard and its hanger-brace in such manner as to relieve the side projecting screw-bolt, by which the side shovel-bar is adjustably secured to the beam from the great force exerted upon the side shovel-carrying bar. This object is effected by a brace, which is secured at its lower end to the main plow-standard and to its hanger-brace below the beam by the screw-bolt which fastens the brace, the main plow-standard, and its hanger-brace together, and at its upper end to the side projecting screw-bolt, so that the upward force exerted upon the side shovel-carrying bar is borne by an upward pull upon said brace, and not by an upward force upon the side projecting screw, which would otherwise fail to carry the side shovel in proper relation to the main shovel. In shovel-plows of this kind the side shovel-carrying bar has been adjustably connected to the beam in various ways and supported by a brace connected to a bracket on the side of the beam, in which the force upon the side shovel-bar tends to bend the brace or break the confining-screws of the side bracket in the same manner as it would tend to bend the side projecting screw. In shovel-plows of this kind the main plow-standard has been formed of a bent strap pivoted to the beam and adjustably combined with a hanger-brace, and it is with such construction that I have combined the detachable side shovel-carrying bar by a brace adapted for adjustment with the main plow-standard and supporting the side shovel-bar by the hanger-brace firmly bolted to the under side of the plow-beam, and by the main plow-standard bolted to the sides of the beam.

Figure 1:
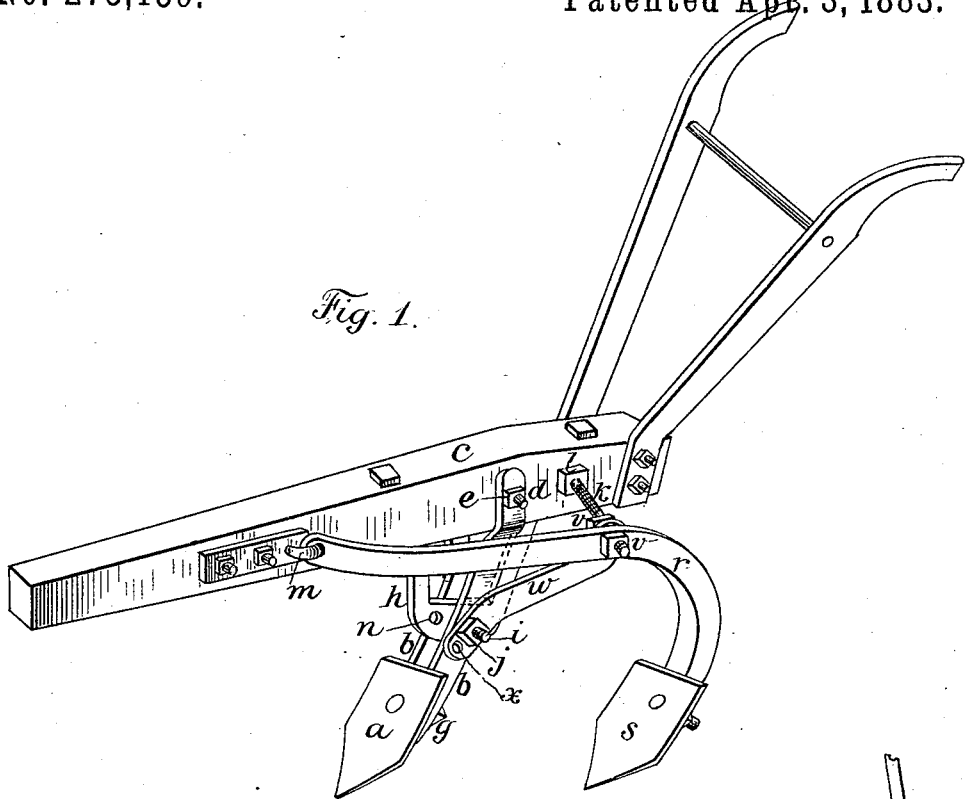
Figure 2:
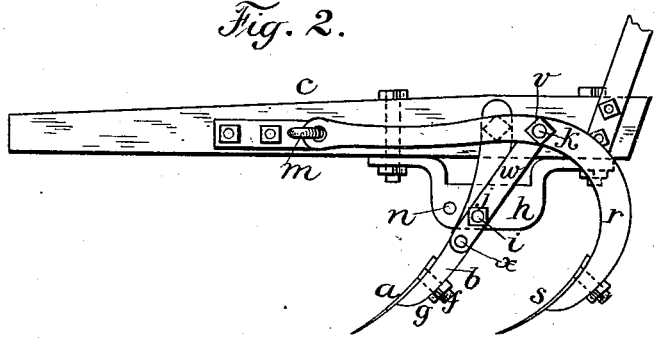
Figure 3:
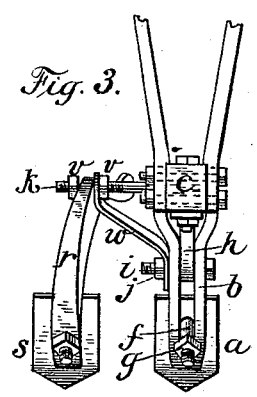
Figure 4:
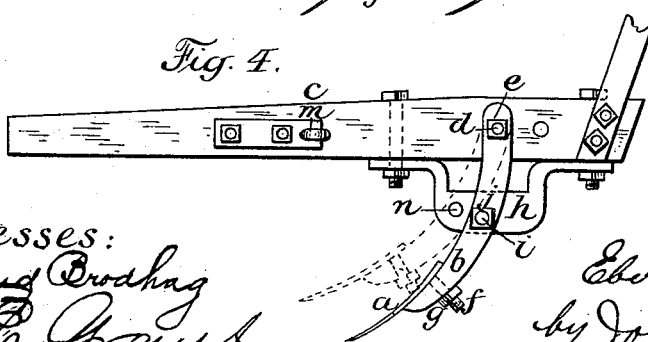

In the accompanying drawings, Figure 1 represents my improved double-shovel plow in perspective; Fig. 2, a side view of the same; Fig. 3, a rear elevation of the same, and Fig. 4 a side view of the single-shovel plow.

The main shovel $a$ is secured to the lower end of a bar, $b$, forged of U form, pivoted at its open end to the beam $c$ by a bolt, $d$, passing through the ends of the bar $b$ and secured by a nut, $e$. The shovel $a$ is secured by a bolt, $f$, passing through between the bent bars and clamped by a nut, $g$, so that the shovel can be set down on the foot of the bar as it wears away. A hanger, $h$, is bolted to the under side of the beam in position between the bent bar, which is secured to it by a bolt, $i$, passing through both sides of said bar $b$ and secured by a nut, $j$. This hanger extends below the beam, near the middle of the length of said bar, and braces it against side strain. The hanger is provided with two or more holes, $n$, whereby the shovel-carrying bar $b$ can be set to run the shovel at more or less pitch by changing the bolt $i$, as shown by dotted lines in Fig. 4, the bent bar, in such adjustment, turning upon its beam-securing bolt. The hanger extends in front and rear of the bent bar, and its connection with the latter makes it a brace and a support for the main shovel-carrying bar. The hanger thus arranged serves to turn away the rubbish which might be otherwise collected upon the bent bar and choke the plow. The hanger has straight ends by which it is bolted to the beam, so that while practically forming a fixed standard for the shovel-plow, is, in fact, a beam attachment, serving the several purposes stated, and particularly adapts an adjustable shovel-plow for use with an ordinary plow-beam. The beam is provided with a long screw-bolt, $k$, secured by nuts $l\ l$, so as to extend from one side in rear of the bent bar, and on the same side a hook, $m$, is secured to the beam near its front end, and the long screw-bolt and the hook thus arranged adapt the beam to receive a second shovel-carrying bar, $r$, its front formed with an eye, by which to secure it upon the hook $m$, and its rear end forming a curved standard for the second shovel, $s$. This attachable second shovel-bar is secured to the long screw-bolt by nuts $v\ v$, so that it can be set nearer to or farther from the beam-shovel. This second shovel-bar, however, could not be so used with the long beam-bolt but for the brace $w$, by which to relieve said long screw-bolt from the great force and strain in plowing. The brace $w$ for this purpose is secured to the bar $r$ by the long bolt $k$ and nuts $v\ v$, and to the plow-beam shovel-bar and to its supporting and bracing hanger by the bolt $i$. This brace is provided with two or more holes, $x$, to allow for the adjustment of the main shovel-bar to give its shovel more or less pitch, as stated. The hanger $h$ and the brace $w$, when both are used for a double-shovel plow, co-operate to connect, brace, and support both shovel-carrying bars and allow of their adjustment, as stated, and such construction and arrangement forms a novel means whereby a single or double shovel is used with the ordinary plow-beam provided with handles and a clevis.

I claim—

1. The combination, in a shovel-plow, of the pivoted beam-standard $b$ and its hanger-brace $h$ with the side shovel-carrying bar, $r$, the side projecting screw-bolt, $k$, nuts $v\ v$, the brace $w$, and the screw-bolt $i$, the said brace being secured to the plow-standard $b$ and to its hanger-brace below the beam, and to the screw-bolt $k$, passing through the beam, substantially as described, for the purpose specified.

2. In combination with the plow-beam provided with the side hook, $m$, and the hanger-brace $h$, of the plow-standard $b$, the side shovel-bar, $r$, the screw-bolt $k$, nuts $v\ v$, and the brace $w$, said brace being secured to the screw-bolt $k$, to the plow-standard $b$, and to the hanger-brace, and adapted for adjustment with plow-standard, substantially as described, for the purpose specified.

In testimony whereof I have hereunto set my hand in the presence of two subscribing witnesses.

EBER P. DAVIS.

Witnesses:
HERMAN APPLE,
J. B. MICKLE.